United States Patent
Kluge et al.

(10) Patent No.: US 7,467,819 B2
(45) Date of Patent: Dec. 23, 2008

(54) CONTROL PROCESS AND DEVICE FOR MOTOR VEHICLES WITH A FOLDAWAY ROOF

(75) Inventors: Reinhold Kluge, Hallbergmoos (DE); Carsten Eidmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/521,313

(22) Filed: Sep. 15, 2006

(65) Prior Publication Data

US 2007/0007791 A1    Jan. 11, 2007

Related U.S. Application Data

(63) Continuation of application No. PCT/EP2005/002627, filed on Mar. 11, 2005.

(30) Foreign Application Priority Data

Mar. 18, 2004    (DE)    ........................ 10 2004 013 229

(51) Int. Cl.
  *B60J 7/00*    (2006.01)
(52) U.S. Cl. .............. 296/107.01; 388/904; 296/107.09
(58) Field of Classification Search ............ 296/107.01, 296/107.08, 107.09; 388/904
See application file for complete search history.

(56) References Cited

U.S. PATENT DOCUMENTS

| 4,737,700 | A | | 4/1988 | Doelves |
| 4,749,193 | A | * | 6/1988 | Hacker .................. 296/107.01 |
| 5,520,432 | A | | 5/1996 | Gmeiner et al. |
| 5,772,274 | A | * | 6/1998 | Tokarz .................. 296/107.09 |
| 6,273,492 | B1 | * | 8/2001 | Schroder et al. ....... 296/107.01 |
| 6,299,233 | B1 | * | 10/2001 | Mentink ................ 296/107.09 |
| 7,185,939 | B2 | * | 3/2007 | Stark et al. ............. 296/107.01 |
| 2002/0185886 | A1 | | 12/2002 | Obendiek |
| 2003/0005692 | A1 | * | 1/2003 | Mentink et al. ............... 60/456 |

FOREIGN PATENT DOCUMENTS

DE    37 26430 C1    9/1988

(Continued)

OTHER PUBLICATIONS

International Search Report dated Jul. 6, 2005 with an English translation of the pertinent portions (Four (4) pages).

(Continued)

*Primary Examiner*—Jason S Morrow
(74) *Attorney, Agent, or Firm*—Crowell & Moring LLP

(57) ABSTRACT

In a control process and control device for motor vehicles with an unfoldable roof, in which at least one roof part or a lid is moved in at least one movement phase defined by a displacement path for the roof part or the lid, the displacement path is bounded by two end positions. By way of an electronic control device, the displacement device for the movement of the roof part or of the lid is actuated such that the speed at which the roof part or the lid is moved is smaller for a first path segment beginning the displacement path and for a second path segment ending the displacement path than the speed for the path segment between the first path segment and the second path segment.

10 Claims, 2 Drawing Sheets

FOREIGN PATENT DOCUMENTS

| | | |
|---|---|---|
| DE | 43 20 468 C1 | 10/1994 |
| DE | 196 42 154 A1 | 4/1998 |
| DE | 101 08 493 A1 | 9/2001 |
| EP | 0 228 475 B1 | 3/1989 |
| EP | 0 836 778 A1 | 4/1998 |

OTHER PUBLICATIONS

German Office Action dated Feb. 18, 2005 with an English translation of the pertinent portions (Six (6) pages).

* cited by examiner

CONTROL PROCESS AND DEVICE FOR MOTOR VEHICLES WITH A FOLDAWAY ROOF

CROSS REFERENCE TO RELATED APPLICATIONS

This application is a continuation of PCT International Application No. PCT/EP2005/002627, filed Mar. 11, 2005, which claims priority under 35 U.S.C. § 119 to German Patent Application No. 10 2004 013 229.1 filed Mar. 18, 2004, the entire disclosures of which are herein expressly incorporated by reference.

BACKGROUND AND SUMMARY OF THE INVENTION

The invention relates to a control process and a control device for motor vehicles with a foldaway roof according to which at least one roof part or a lid is moved in at least one movement phase defined by a displacement path of the roof part or the lid, the displacement path being bounded by two end positions.

Devices or processes of this type are sufficiently well known in connection with so-called Cabrio motor vehicles. The invention relates to unfoldable, and in given cases also fold-away, roofs in the form of unfoldable textile convertible tops (cf., for example, DE 37 26 430 C1) as well as in the form of retractable hard tops, which also include, at least in part, fixed pieces of roof parts (cf., for example, DE 196 42 154 A1).

Generally, for motor vehicles, processes are known which exercise speed control with a view toward protective functions during shutting of moving units (for example, windows or sunroofs) by use of a controllable displacement device.

The objective of the invention is to improve upon so-called control units for convertible tops in Cabrios. On the one hand, this is done with a view to providing as fast an opening and closing as possible, but, on the other hand, with a view to providing movement processes which are as harmonious as possible.

This objective is realized according to the invention by a control process and device for motor vehicles with an unfoldable roof, according to which at least one roof part or a lid is moved in at least one movement phase defined by a displacement path of the roof part or the lid, the displacement path being bounded by two end positions. The displacement device for the movement of the roof part or of the lid is actuated by way of an electronic control device, wherein by way of the electronic control device, the displacement device is actuated such that the speed at which the roof part or the lid is moved is smaller for a first path segment beginning the displacement path and for a second path segment ending the displacement path than it is for the speed of the path segment between the first path segment and the second path segment. Advantageous further developments and embodiments of the invention are described and claimed herein.

Through the invention, a soft startup mode, designated herein as a "Soft Start" and a soft run-down mode, designated herein as a "Soft Landing" are realized in a movement phase of a roof part (foldable or collapsible) and/or a lid (for example, a lid for the storage compartment for the convertible top) on opening or closing of the roof part. In that regard, a roof part or a lid may also carry out several movement phases. Also, it is understood that several roof parts may carry out one movement phase simultaneously.

The invention is based on the insight that, on the opening or closing of convertible tops or retractible hard tops by way of electrical and/or hydraulic mechanisms, undesirable rearward or oscillating movements occur due to the relatively heavy masses. To solve this problem, a variable-speed displacement device is provided which makes possible a soft acceleration or deceleration of the masses, in particular at the beginning and at the end of a movement phase. At the beginning and at the end of a movement phase, roof parts or lids will, therefore, be moved more slowly than within the customary displacement path. It has been found that with a slow acceleration and a slow deceleration at the start of a movement phase and at the end of a movement phase, a speed which is faster than the state of the art within the customary displacement path can be set by preventing disturbing oscillations in these movement phases. Altogether, for an unfoldable, and in given cases fold-away, roof, a shorter opening and closing time than in the state of the art can be achieved in this way.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE DRAWINGS

Figure 1:
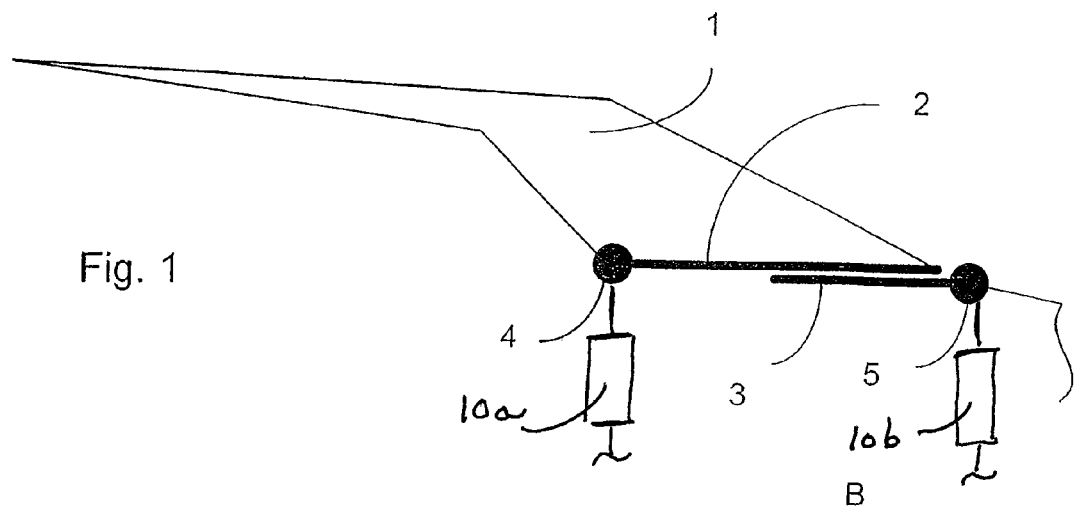
FIG. 1 is a schematic diagram of an unfoldable and foldaway roof with a roof part, and a lid in the form of a lid for the storage compartment for the convertible top, where the roof part and the lid are represented in a resting position.
Figure 2:
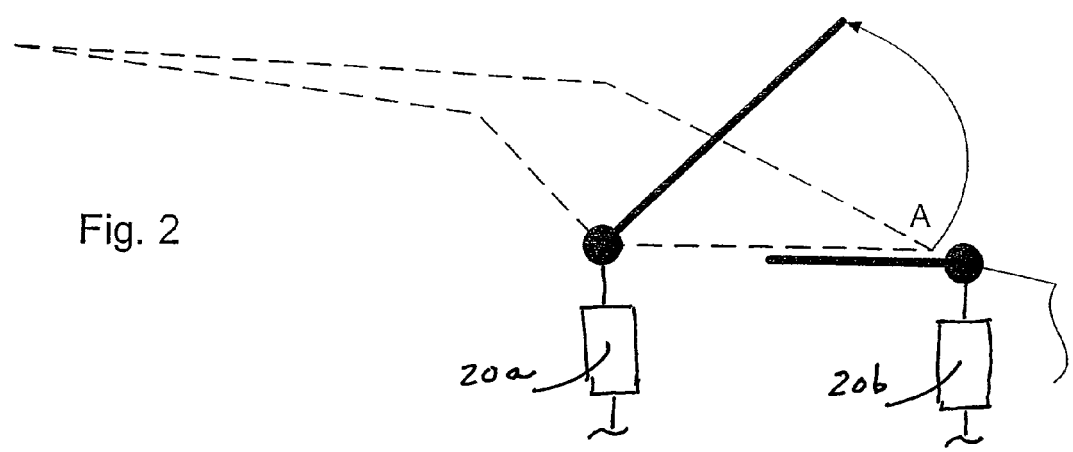
FIG. 2 is a schematic diagram of an unfoldable and foldaway roof with a roof part, and a lid in the form of a lid for the storage compartment for the convertible top, where the roof part has run through a first movement phase.

In FIG. 1 an unfoldable and fold-away roof 1 with a roof part 2 and a lid 3 (in the form of a lid for the storage compartment for the convertible top) is represented in schematic form. The roof 1 includes, in given cases, additional controllable roof parts not represented here. On opening and closing of the roof 1, the roof part 2 and the lid 3 carry out several movement phases (here, only one is represented for each case). FIG. 2 shows a first movement phase of the roof part 2, which is defined by a displacement path "s" (see FIG. 3 and FIG. 4) of the roof part 2. The displacement path is bounded by the two end positions A and B.

Figure 3:
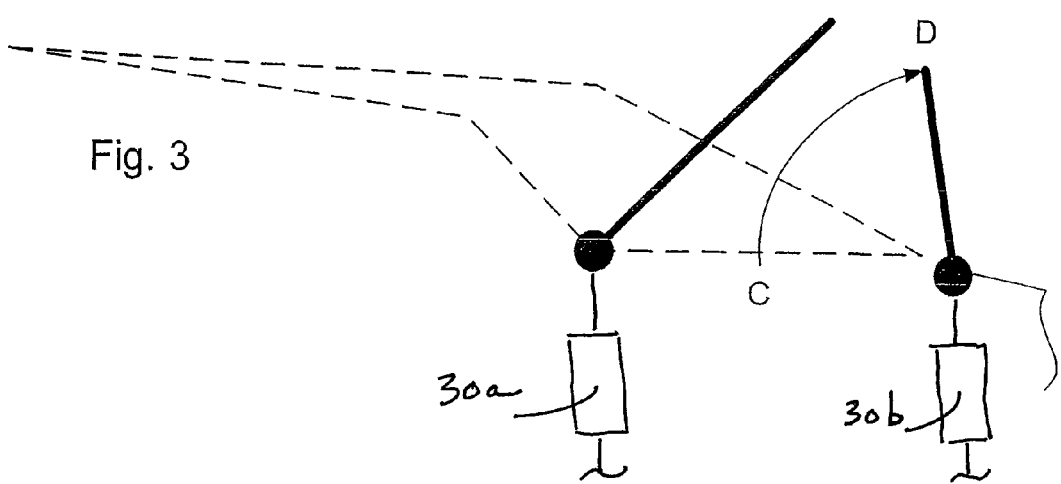
FIG. 3 is a schematic diagram of an unfoldable and foldaway roof with a roof part, and a lid in the form of a lid for the storage compartment for the convertible top, where the lid has run through a first movement phase.

FIG. 3 shows a first movement phase of the lid 3, which follows the movement phase of the roof part 2 from A to B and which is defined by a displacement path s of the lid 3. The displacement path is bounded by the two end positions C and D. Furthermore, the displacement device 4 for the roof part 2 and the displacement device 5 for the lid 3 are indicated in schematic form in FIGS. 1 to 3. A displacement device may include one or more actuators working together with mechanical and/or hydraulic components. Such mechanical and/or hydraulic components are indicated by components 10a 10b, in FIG. 1; components 20a, 20b in FIG. 2: and, components 30a, 30b in FIG. 3, with each being coupled to a displacement device, such as displacement devices 4 and 5 in FIG. 1. A particularly simple and economical displacement device is described further below in connection with FIG. 6.

The displacement path "s" of the roof part 2 can, for example, be defined as a path which results during the movement phase through the process of movement relative to a certain point of the roof part. The predefined speed curve v then relates to the speed at which this point moves. The invention encompasses any actuation of the displacement device which leads to this speed curve v. The actuation for this may, for example, be determined empirically and stored in the control device as a characteristic curve, table, or characteristic map. For simplicity's sake, the process according to the invention is carried out in an advantageous manner as a control and not as a regulation.

Figure 4:
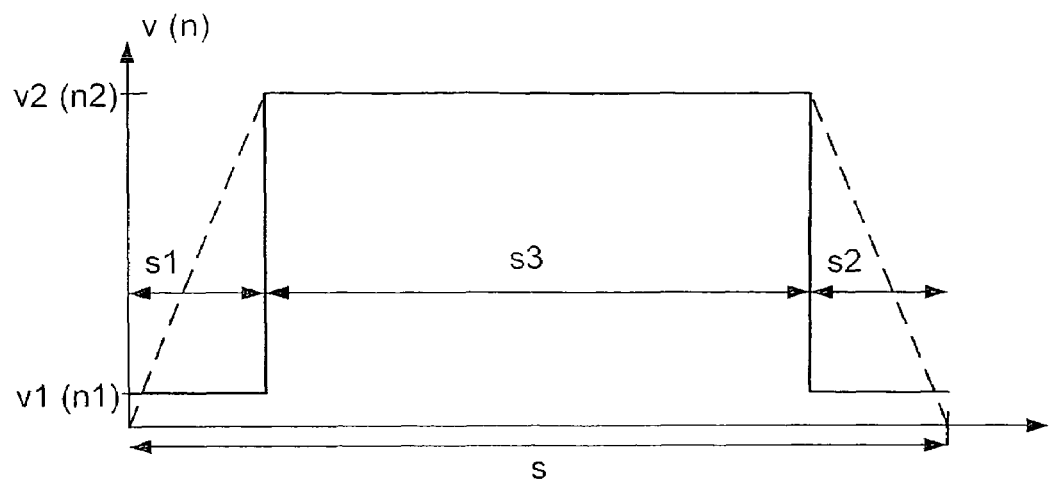
FIG. 4 is a graphic illustrating a first possible predefined speed of the roof part in the first movement phase according to the invention.
Figure 5:
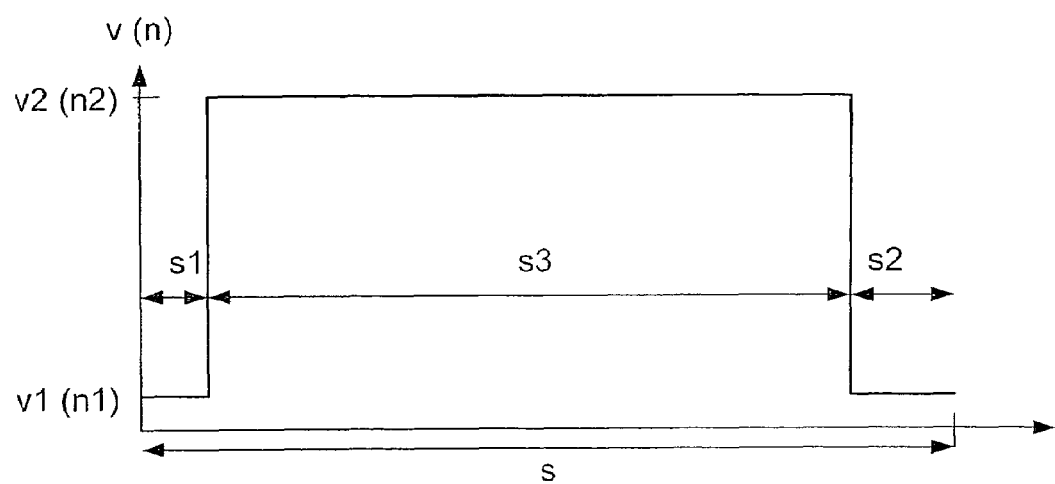
FIG. 5 is a graph illustrating a second possible predefined speed of the roof part in the first movement phase according to the invention.

The electronic control device, which is customarily used in any case for control units for convertible tops, includes measures, e.g., a corresponding stored new program part and corresponding end steps for the actuation of the displacement device 4 and/or 5, through which the displacement device 4 and/or 5 is actuated such that the speed at which the roof part 2 or the lid 3 is moved at the start and at the end of the displacement path s, i.e., for a first path segment s1 beginning the displacement path and for a second path segment s2 ending the displacement path s, is smaller than the speed v for the path segment s3 between the first path segment and the second path segment, i.e., between the start and the end of the displacement s (cf. also FIGS. 4 and 5).

In FIGS. 4 and 5, speed curves v according to the invention are predefined in schematic form for a given displacement path s. In FIG. 4, for the first path segment s1 beginning the displacement path s and for the second path segment s2 ending the displacement path s, a first speed v1 is predefined, which is smaller than the second speed v2 for the path segment s3 between the first and second path segments. In FIG. 4, the comparatively low speed v2 is predefined to last an equally long time for the first path segment s1 and the second path segment s2. In FIG. 5, it is shown that the comparatively low speed v2 can also be predefined to last so that the time for the first path segment s1 and the time the second path segment s2 are different.

Alternatively, according to the dashed line in FIG. 4, a continuous increase and decrease for the first path segment s1 and the second path segment s2 can be carried out. For this, for example, an actuator of a displacement device could be actuated by the control device with a corresponding pulse width-modulated signal. However, due to the frequent change of edge in an actuation of this type, problems could arise in regard to the electromagnetic compatibility of the system.

Figure 6:
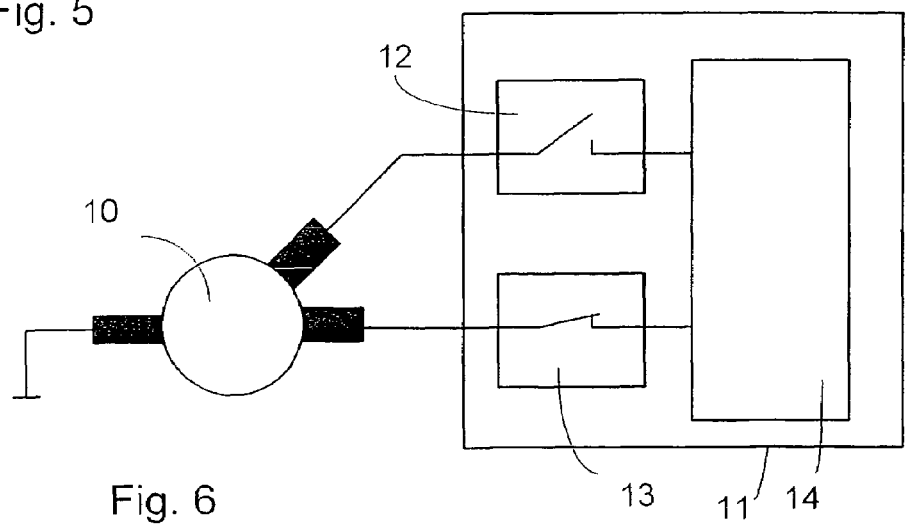
FIG. 6 is a simplified schematic block diagram of an arrangement for the actuation of the displacement device for reaching the predefined speed of the roof part.

A particularly simple and economical development of the invention is explained in connection with FIG. 6. The displacement device 4 or 5 advantageously comprises an electric motor 10, whose rotational speed may be adjusted by the control device 11 with a view to reaching the predefined speed v.

The following is given as technological background. Customarily, convertible tops and retractible hard tops are moved by use of hydraulic components, which are driven by a hydraulic pump with an electric motor. The hydraulic components include, for example, a valve block for switching the individual hydraulic circuits assigned to the respective roof parts or lids. Previously, the hydraulic pump, like the individual valves, has been switched on or off "digitally" via the electric motor with a single relatively high rotational speed or power level, i.e., a hard switching on or off. This can lead to the above-mentioned undesirable disturbing oscillations since the hydraulic cylinders immediately receive the full, incompressible fluid stream.

According to the invention, an electric motor of this type (corresponding to the electric motor 10 represented in FIG. 6) is configured in such a manner that it can be operated at two different power levels or rotational speeds n1 and n2. The rotational speeds n1 and n2 are chosen such that the electric motor 10 can be operated by the control device 11 by use of a corresponding program part 14 and via corresponding closing of the switches (or end stages) 12 and 13 at the first rotational speed n1 for reaching the predefined, comparatively low, first speed v1 for the first path segment s1 and the second path segment s2, and at the second rotational speed n2 for reaching the predefined, comparatively high, second speed v2 for the customary displacement path s3.

Advantageously, the control device 11 is switched off via the program part 14 in such a manner that the change-over from the first rotational speed n1 to the second rotational speed n2, and/or the change-over from the second rotational speed n2 to the first rotational speed n1, can be carried out as a function of the external temperature and/or of the state of the vehicle's battery. In so doing, the low speed v1 predefined for first path segment s1 and/or the second path segment s2 is generally predefined to be shorter the lower the external temperature and/or the poorer the state of the vehicle's battery or the lower the voltage of the vehicle's battery.

Alternatively, the displacement device may include, instead of an electric motor which can be varied in its rotational speed, positioning members (for example, valves), which control or regulate a hydraulic pump and the volume flow of the hydraulic fluid for the control of the convertible top. A hydraulic pump of this type usually can be operated only at a single fixed rotational speed. This hydraulic pump may also work together with a corresponding actuation of the positioning members by the control device 11 in such a manner that a predefined speed v is reached. The positioning members, such as valves, can be included as, or with, components 10a, 10b and 20a, 20b and 30a, 30b as shown in FIGS. 1-3, respectively.

However, this alternative might be more complicated to realize than the aforementioned electric motor version.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control process for a motor vehicle having a roof with at least one roof part or a lid movable in at least one movement phase defined by a displacement path of the roof part or the lid which is bounded by two end positions, the control process comprising the acts of:

for a first path segment beginning the displacement path and for a second path segment ending the displacement path, moving the roof part or the lid at a first speed;

for a third path segment between the first path segment and the second path segment, moving the roof part or the lid at a second speed greater than the first speed; and wherein a displacement device for the movement of the roof part or the lid at the first and second speeds is actuated by a programmed electronic control devices, wherein a change-over between said first speed and said second speed comprises a controlled transition as a function of an external temperature.

2. The control process according to claim 1, wherein the displacement device comprises an electric motor with a rotational speed that is adjustable by the programmed electronic control device to reach the first and second speeds.

3. The control process according to claim 2, wherein the electric motor is operated by the programmed electronic control device at a first rotational speed for reaching the first speed which is predefined, and comparatively low, for the first and second path segment, and at a second rotational speed for reaching the second speed which is predefined, and comparatively high, for the third path segment.

4. The control process according to claim 3, wherein a change-over from the first rotational speed to the second rotational speed and/or a change-over from the second rotational speed to the first rotational speed is carried out by the programmed electronic control device as a function of at least one from the group consisting of an external temperature and a state of a battery of the vehicle.

5. The control process according to claim 1, wherein the displacement device comprises positioning members, which control or regulate a hydraulic pump and a volume flow, and further wherein with said positioning members, the volume flow is set by the programmed electronic control device to reach the first and second speeds.

6. A control device for a motor vehicle with a roof in which at least one roof part or a lid is movable in at least one movement phase defined by a displacement path for the roof part or the lid, the displacement being bounded by two end positions, the control device comprising:

a displacement device for moving the roof part or the lid;

a programmed electronic control device operatively coupled to actuate the displacement device;

wherein the programmed electronic control device comprises means for actuating the displacement device such that a speed at which the roof part or the lid is moved is smaller for a first path segment beginning the displacement path and for a second path segment ending the displacement path than for a speed for a third path segment between the first path segment and the second path segment, wherein the displacement device comprises an electric motor with a rotational speed that is adjustable by the programmed electronic control device so as to reach the speeds, wherein the electric motor is operable by the programmed electronic control device at a first rotational speed for reaching a predefined, comparatively low, first speed for the first and second path segment, and at a second rotational speed for reaching a predefined, comparatively high, second speed for the third path segment, wherein the electronic control device is configured such that a change-over from the first rotational speed to the second rotational speed and/or a change-over from the second rotational speed to the first rotational speed is carried out as a function of at least one from the group consisting of an external temperature and state of a battery of the vehicle.

7. The control device according to claim 6, wherein the displacement device comprises positioning members, which control or regulate a hydraulic pump and a volume flow, and further wherein the programmed electronic control device is configured such that the volume flow is settable by the programmed electronic control device by use of corresponding actuation of the hydraulic pump and the positioning members in order to reach the speeds.

8. The control process according to claim 1, wherein a change-over between said first speed and said second speed comprises a controlled transition as a function of a state of a battery of the vehicle.

9. The control process according to claim 1, wherein said first speed is a predefined speed as a function of the group consisting of an external temperature and a state of a battery of the vehicle.

10. The control process according to claim 1, wherein said second speed is a predefined speed as a function of the group consisting of an external temperature and a state of a battery of the vehicle.

* * * * *